US012438279B2

(12) United States Patent
Wu et al.

(10) Patent No.: US 12,438,279 B2
(45) Date of Patent: Oct. 7, 2025

(54) BASE STATION ANTENNA

(71) Applicant: Outdoor Wireless Networks LLC, Claremont, NC (US)

(72) Inventors: Bo Wu, Allen, TX (US); Bin Sun, Jiangsu (CN); YueMin Li, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 254 days.

(21) Appl. No.: 18/001,565

(22) PCT Filed: Jun. 25, 2021

(86) PCT No.: PCT/US2021/039119
§ 371 (c)(1),
(2) Date: Dec. 12, 2022

(87) PCT Pub. No.: WO2022/010669
PCT Pub. Date: Jan. 13, 2022

(65) Prior Publication Data
US 2023/0238707 A1 Jul. 27, 2023

(30) Foreign Application Priority Data
Jul. 9, 2020 (CN) ......................... 202010657235.3

(51) Int. Cl.
*H01Q 9/28* (2006.01)
*H01Q 1/24* (2006.01)
(Continued)

(52) U.S. Cl.
CPC ............. *H01Q 9/285* (2013.01); *H01Q 1/246* (2013.01); *H01Q 3/38* (2013.01); *H01Q 21/08* (2013.01); *H01Q 21/24* (2013.01)

(58) Field of Classification Search
CPC .......... H01Q 9/285; H01Q 1/246; H01Q 3/38; H01Q 21/24; H01Q 1/50
See application file for complete search history.

(56) References Cited

U.S. PATENT DOCUMENTS 10,879,605 B2 12/2020 Varnoosfaderani et al.
2007/0229385 A1 10/2007 Deng et al.
(Continued)

FOREIGN PATENT DOCUMENTS

CN 110429392 A * 11/2019 ............. H01Q 1/246

OTHER PUBLICATIONS

"International Search Report and Written Opinion of the International Searching Authority", International Application No. PCT/US2021/039119, Oct. 27, 2021, 12 pp.

*Primary Examiner* — Hai V Tran
*Assistant Examiner* — Austin M Back
(74) *Attorney, Agent, or Firm* — Myers Bigel, P.A.

(57) ABSTRACT

A base station antenna includes a first radio frequency ("RF") port; a second RF port; a first array of radiating elements that includes a first radiating element, the first radiating element including first and second radiators each having the first polarization direction, wherein the first radiator is coupled to the first RF port; a second array of radiating elements that includes a second radiating element, the second radiating element including a third radiator having the first polarization direction; and a first power divider having a first input that is coupled to the second RF port, and first and second outputs that are respectively coupled to the second and third radiators.

23 Claims, 7 Drawing Sheets

(51) Int. Cl.

| | |
|---|---|
| ***H01Q 3/38*** | (2006.01) |
| ***H01Q 21/08*** | (2006.01) |
| ***H01Q 21/24*** | (2006.01) |

(56) References Cited

U.S. PATENT DOCUMENTS

| | | | | |
|---|---|---|---|---|
| 2016/0248166 | A1 | 8/2016 | Moon et al. | |
| 2019/0273315 | A1 | 9/2019 | Hu et al. | |
| 2020/0321697 | A1* | 10/2020 | Zimmerman .......... | H01Q 21/26 |
| 2021/0257720 | A1* | 8/2021 | Wan ....................... | H01Q 21/26 |
| 2021/0320399 | A1* | 10/2021 | Bisiules ................. | H01Q 21/24 |

* cited by examiner

BASE STATION ANTENNA

CROSS-REFERENCE TO RELATED APPLICATIONS

The present application is a 35 U.S.C. § 371 national stage application of PCT Application No. PCT/US2021/039119, filed on Jun. 25, 2021, which itself claims priority to Chinese Patent Application No. 202010657235.3, filed Jul. 9, 2020, the entire contents of both of which are incorporated herein by reference as if set forth fully herein.

The present application claims priority to Chinese Patent Application No. 202010657235.3, filed Jul. 9, 2020, the entire content of which is incorporated herein by reference as if set forth fully herein.

FIELD

The present invention relates to communication systems and, more particularly, to base station antennas.

BACKGROUND

Each cell in a cellular communication system has one or more base station antennas that are configured to provide two-way wireless/radio frequency ("RF") communication to mobile users geographically located within the cell. FIG. 1A is a schematic diagram of a conventional base station 60. The base station 60 includes a base station antenna 50 that may be mounted on raised structure 30. The raised structure 30 may be an antenna tower, but it will be appreciated that a wide variety of mounting locations may be used including, for example, utility poles, buildings, water towers and the like. The base station 60 also includes base station equipment, such as baseband units 40 and radios 42. A single baseband unit 40 and a single radio 42 are shown in FIG. 1A to simplify the drawing, but it will be appreciated that more than one baseband unit 40 and/or radio 42 may be provided. Additionally, while the radio 42 is shown as being co-located with the baseband unit 40 at the bottom of the raised structure 30, it will be appreciated that in other cases the radio 42 may be a remote radio head that is mounted on the raised structure 30 adjacent the antenna. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the base station antenna 50 for transmission via a cabling connection 44. It will also be appreciated that the base station 60 of FIG. 1A will typically include various other equipment (not shown) such as, for example, a power supply, backup batteries, a power bus, Antenna Interface Signal Group ("AISG") controllers and the like.

FIG. 1B is a schematic front view of a base station antenna. In FIG. 1B and other drawings herein, "X" represents a dual-polarized crossed dipole radiating element. The cross-dipole radiating element includes two dipole radiators orthogonal to each other, and they transmit/receive signals in polarization directions slanted at −45° and +45° relative to a first longitudinal direction of the base station antenna, respectively. The base station antenna includes two linear arrays 50-1 and 50-2. Each linear array 50-1, 50-2 includes crossed dipole radiating elements 52 arranged along a longitudinal center axis of the respective array.

The radiating element 52 may be configured to operate in the frequency band of 617~960 MHz so as to enable the base station antenna to provide services in some or all of the 617~960 MHz frequency band. The base station antenna with the configuration shown in FIG. 1B may be used for a variety of applications, including, for example, multiple input multiple output ("MIMO") applications, or serving as a multi-band antenna to provide cellular service in two different frequency ranges. In one example, the linear array 50-1 may be configured to operate around 700 MHz and the linear array 50-2 may be configured to operate around 800 MHz. The base station antenna further includes RF ports 1 to 4, and a first signal of +45° polarization at 700 MHz, a second signal of −45° polarization at 700 MHz, a third signal of +45° polarization at 800 MHz, and a fourth signal of −45° polarization at 800 MHz may be respectively transmitted through the cable connections 44 from/to the radio 42 as described above. Slant +45° and −45° radiators of each radiating element 52 in the linear array 50-1 are coupled to the RF ports 1 and 2, respectively, and slant +45° and −45° radiators of each radiating element 52 in the linear array 50-2 are coupled to the RF ports 3 and 4, respectively.

Four-polarized (also called quad-polarized) radiating elements ("QR") are known in the prior art. For example, FIG. 1C is a schematic plan view of a QR that is substantially configured in a rectangle, that is, a box radiating element. The box radiating element includes dipole radiators 10 through 40. Each dipole radiator is configured by bending a conventional dipole radiator so that an angle between the two radiating arms thereof becomes approximately 90°, that is, each dipole radiator includes two substantially L-shaped dipole arms. Each dipole radiator is fed in the middle or "center-fed." As an example, the dipole radiator 10 includes a feeding portion 13 located in the middle of the dipole radiator 10 and radiating portions 11, 12 (also referred to as dipole arms) extending from the feeding portion 13, respectively. The two dipole arms of each dipole radiator extend respectively in a lateral direction and a longitudinal direction of the base station antenna so as to obtain polarizations of ±45°. The dipole radiators 10, 20 are respectively arranged oppositely at two opposite vertices of the rectangle in the −45° direction, so that the dipole radiators 10, 20 obtain respective polarizations of +45°, respectively. The dipole radiators 30, 40 are respectively arranged oppositely at two opposite vertices of the rectangle in the +45° direction, so that the dipole radiators 30, 40 obtain respective polarizations of −45°, respectively.

QR may be used in base station antennas. For example, at least one of dual-polarized radiating elements ("DR") in an array including multiple DRs as shown in FIG. 1B may be replaced with a QR that is configured to operate in 617~960 MHz band. In order to reduce the adverse effects caused by introducing QR, the QR may be arranged near an end of the array, as shown in FIG. 1D. In FIG. 1D and other drawings herein, "⌜⌟" represents the above described box radiating element. Two radiators at the two opposite vertices of the box radiating element having the same polarization direction are fed collectively. For convenience of illustration, in FIG. 1D and other drawings herein, two dipole radiators in the same radiating element that are fed collectively are depicted by the inclusion of a straight line (or a straight line with a crossover) connecting the two dipole radiators. It will be appreciated that a power divider ("PD") may be used to collectively feed the two dipole radiators.

The QR includes two dipole radiators that are spaced from each other on both sides of a central axis of the QR in each polarization direction. For example, the QR shown in FIG. 1C includes the radiators 30, 40 on both sides of the longitudinal center axis of the QR (at the meantime on both sides of the lateral center axis thereof) operating in the −45° polarization direction, and the radiators 10, 20 on both sides of the longitudinal center axis of the QR (at the meantime on both sides of the lateral center axis thereof) operating in the +45° polarization direction. Since dipole radiators 10, 20 are spaced apart from each other in both the lateral longitudinal dimensions of the base station antenna, the QR will have a +45° polarization "element" pattern having a narrower azimuth beamwidth and a narrower elevation beamwidth. Likewise, since dipole radiators 30, 40 are spaced apart from each other in both the lateral longitudinal dimensions of the base station antenna, the QR will have a −45° polarization "element" pattern having a narrower azimuth beamwidth and a narrower elevation beamwidth, the QR will also have a narrower azimuth beamwidth in the −45° polarization direction. Therefore, the antenna beams generated by each linear array 50-1, 50-2 in FIG. 1D are narrower both in the azimuth plane and in the elevation plane than an antenna beam generated by the corresponding linear array in FIG. 1B, and the antenna beams have higher directivity.

SUMMARY

A first aspect of this disclosure is to provide a base station antenna, which comprises: a first radio frequency ("RF") port; a second RF port; a first array of radiating elements that includes a first radiating element, wherein the first radiating element includes first and second radiators each having the first polarization direction, and the first radiator is coupled to the first RF port; a second array of radiating elements that includes a second radiating element, wherein the second radiating element includes a third radiator having the first polarization direction; and a first power divider having a first input that is coupled to the second RF port, and first and second outputs that are respectively coupled to the second and third radiators.

A second aspect of this disclosure is to provide a base station antenna, which comprises: a first linear array extending along a first longitudinal direction of the base station antenna and including a first radiating element, the first radiating element including first and second radiators each having a first polarization direction; and a second linear array that is laterally adjacent the first linear array extending along a second longitudinal direction of the base station antenna and including a second radiating element, the second radiating element including a third radiator having the first polarization direction, wherein the second and third radiators are fed collectively.

A third aspect of this disclosure is to provide a base station antenna, which comprises: a first linear array extending along a first longitudinal direction of the base station antenna and including a first radiating element, wherein the first radiating element includes a first dipole radiator extending in a first direction that is slant at −45 degrees relative to the first longitudinal direction and a second dipole radiator extending in a second direction that is slant at +45 degrees relative to the first longitudinal direction; and a second linear array that is adjacent the first linear array laterally extending along a second linear array that is laterally adjacent the first linear array extending along a second longitudinal direction of the base station antenna and including a second radiating element that is configured generally in rectangle, the second radiating element including third, fourth, fifth and sixth dipole radiators that are each constructed generally as an L-shape, wherein the third and fourth dipole radiators are arranged respectively at two opposite vertices along the second direction of the rectangle, and the fifth and sixth dipole radiators are arranged respectively at two opposite vertices along the first direction of the rectangle, wherein the first and third radiators are fed collectively.

A fourth aspect of this disclosure is to provide a base station antenna, which comprises: a first array of radiating elements including a first radiating element, the first radiating element including first and second radiators each having a first polarization direction; a second array of radiating elements including a second radiating element, the second radiating element including a third radiator having the first polarization direction; and a feeding assembly configured to feed a first sub-component of a first radio frequency ("RF") signal to the first radiator, and respectively feed first and second sub-components of a second RF signal to the second and third radiators.

A fifth aspect of this disclosure is to provide a base station antenna, which comprises: a first radio frequency ("RF") port; a second RF port; a first array of radiating elements that includes a first radiating element having first and second radiators that each have a first polarization direction and third and fourth radiators that each have a second polarization direction, a second array of radiating elements that includes a second radiating element, the second radiating element comprising a cross-dipole radiating element having a fifth radiator having the first polarization direction and a sixth radiator having the second polarization direction, wherein the first and second radiators are coupled to the first RF port and the third radiator and the sixth radiator are coupled to the second RF port.

A sixth aspect of this disclosure is to provide a base station antenna, which comprises: a first array of radiating elements that includes a first radiating element having first through fourth radiators; a second array of radiating elements that includes a second radiating element, the second radiating element comprising a cross-dipole radiating element; and a power divider having a first output that is coupled to the first radiating element and a second output that is coupled to the second radiating element.

Other features of the present invention and advantages thereof will become explicit by means of the following detailed descriptions of exemplary embodiments of the present invention with reference to the drawings.

Figure 1A:
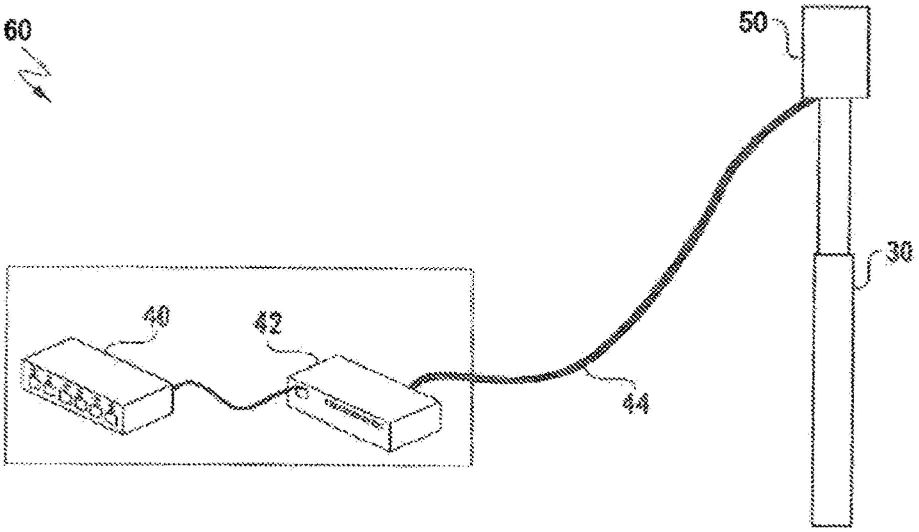
Fig.1A PRIOR ART
FIG. 1A is a simplified schematic diagram of a conventional base station in a cellular communication system.

Note that, in some cases the same elements or elements having similar functions are denoted by the same reference numerals in different drawings, and description of such elements is not repeated. In some cases, similar reference numerals and letters are used to refer to similar elements, and thus once an element is defined in one figure, it need not be further discussed in subsequent figures.

In order to facilitate understanding, the position, size, range, or the like of each structure illustrated in the drawings may not be drawn to scale. Thus, the disclosure is not necessarily limited to the position, size, range, or the like as disclosed in the drawings.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

The terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90° or at other orientation), and the relative spatial relationship between the features will be correspondingly interpreted.

Herein, the term "A or B" used through the specification refers to "A and B" and "A or B" rather than meaning that A and B are exclusive, unless otherwise specified.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used in the following description for the purpose of reference only, and thus are not intended to limit. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

Figure 1B:
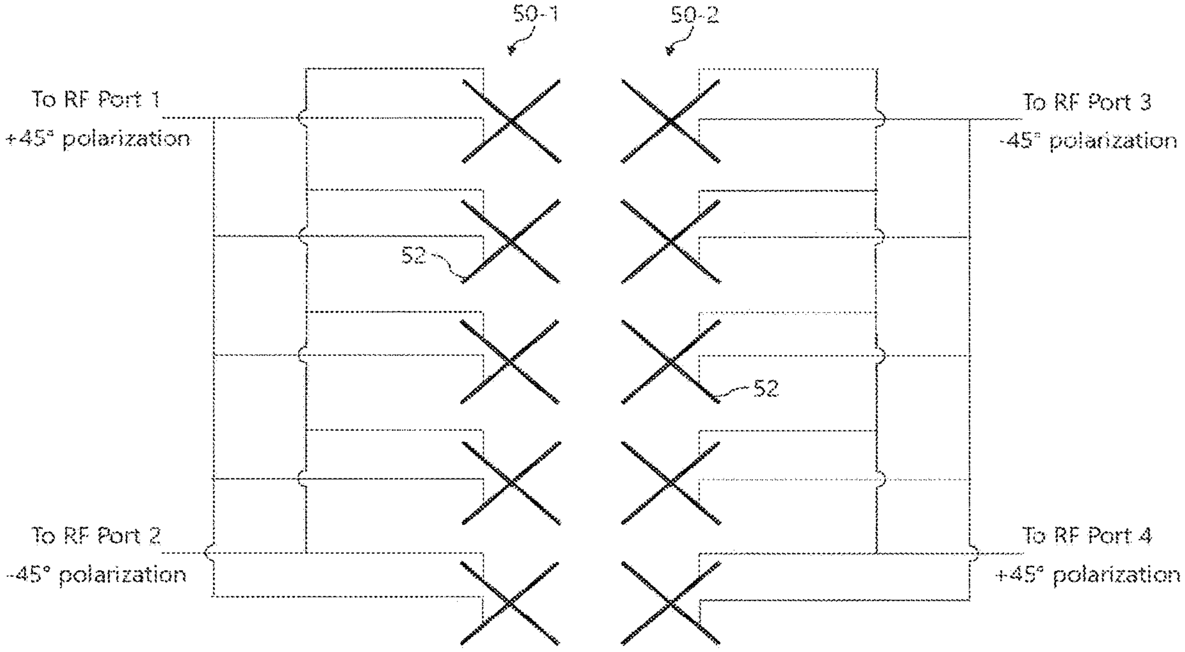
Fig.1B PRIOR ART
FIG. 1B is a schematic diagram of two arrays of radiating elements in a conventional base station antenna and the feeding configurations for the arrays.
Figure 1C:
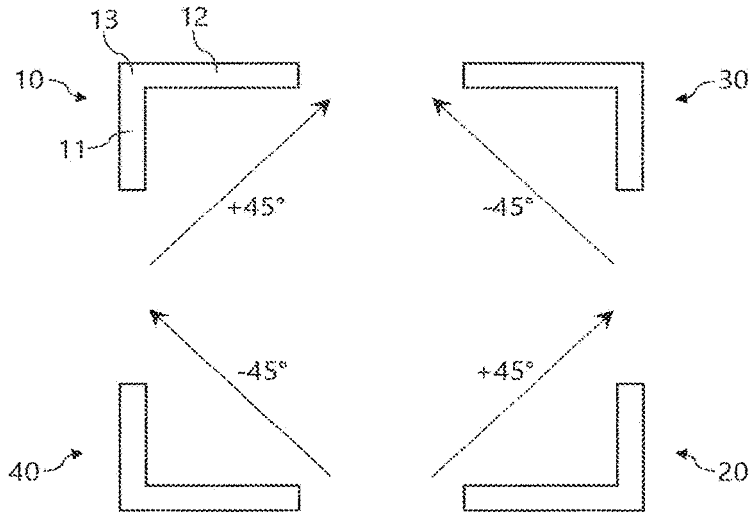
Fig.1C PRIOR ART
FIG. 1C is a schematic front view of a conventional box radiating element that may be used in a base station antenna.
Figure 1D:
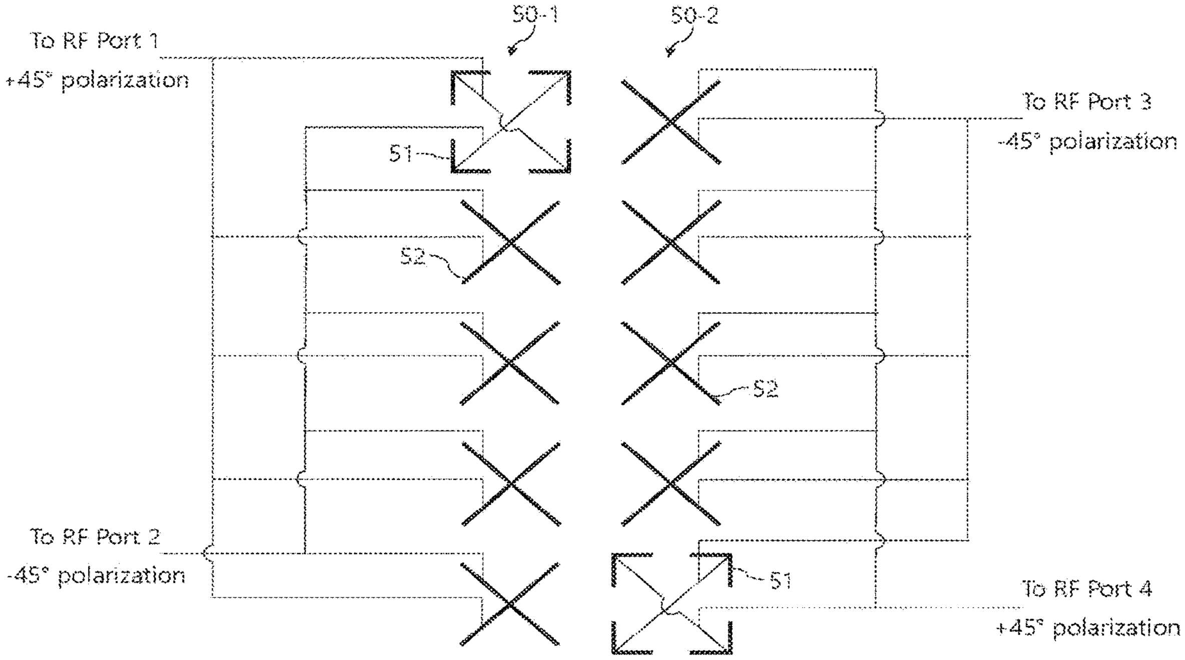
Fig.1D PRIOR ART
FIG. 1D is a schematic diagram of two arrays of radiating elements that each include a box radiating element in a conventional base station antenna and the feeding configurations for the arrays.

In the case where a base station antenna having the configuration shown in FIG. 1D is used for MIMO applications or serves as a multi-band antenna to provide cellular services in two different frequency ranges, the physical dimensions of the radiating elements are often made as small as possible, to keep the length and width of the antenna within ranges desired by cellular operators. Small radiating elements, however, have larger element beamwidths, and hence it may be difficult to meet various performance requirements such as requirements for the half power (−3 dB) beam width ("HPBW") in the azimuth plane and elevation plane and the beam directivity of the antenna beams generated by linear arrays 50-1 or 50-2.

The base station antenna according to an embodiment of the present invention includes first and second linear arrays extending in a longitudinal direction of the base station antenna. The first array includes at least one QR that includes first and second radiators each of which transmits/receives signals in a first polarization direction (e.g., slant −45° with respect to the longitudinal direction of the base station antenna). The second array includes at least one radiating element (which may be QR or DR) that includes a third radiator which transmits/receives signals in the first polarization direction. The first radiator is configured to transmit/receive a first signal, e.g., a signal for the first array. The second radiator and the third radiator are fed collectively, so that both the second and third radiators are configured to transmit/receive a second signal, e.g., a signal for the second array. Since positions of the first and second arrays in the lateral direction of the antenna are different, this configuration may reduce the HPBW of the antenna beam generated by the second array in the azimuth plane along the first polarization direction, and improve the directivity of the antenna beam in the azimuth plane. The two radiating elements (or radiators) being "fed collectively" referred to herein, means that both radiating elements (or radiators) are fed by RF signals output from a single output port of a single phase shifter ("PS"), and a power divider ("PD") and/or another circuit element may be coupled between the output port of the phase shifter and the two radiating elements (or radiators). When the phase shifter is operated to configure phases of signals output from its respective output ports, the phases of the signals that are fed to the two radiating elements (or radiators) are changed collectively in a definite relationship. The amplitudes and phases of the respective RF signals that are collectively fed to the two radiating elements (or radiators) may be configured according to a required beam width and pointing direction of the antenna beam, for example, the amplitudes of the respective RF signals may be identical or different, and a phase difference between the two signals may be zero or non-zero.

In another embodiment, the QR in the first array and the at least one radiating element in the second array may not be aligned along the lateral direction of the antenna, that is, their positions along the longitudinal direction of the antenna may be different. This configuration may further reduce the HPBW of the antenna beam in the elevation plane along the first polarization direction generated by the second array, and increase the directivity of the antenna beam in the elevation plane. For the second polarization direction (for example, slant +45° relative to the longitudinal direction of the base station antenna), the above configuration may be used or not as needed.

Figure 2A:
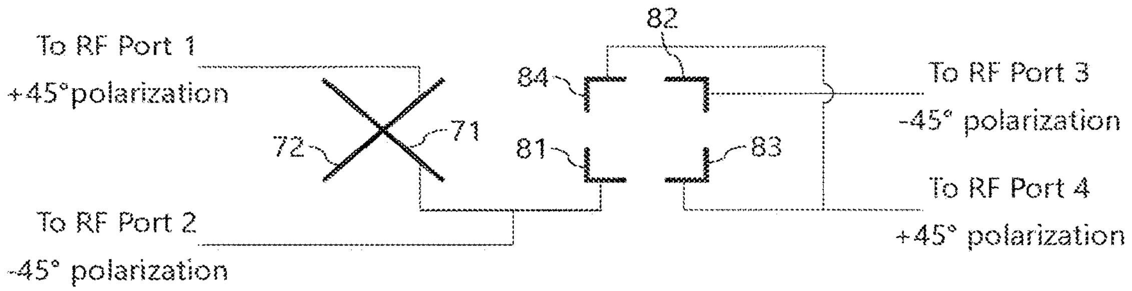
FIG. 2A is a schematic diagram of an array of radiating elements and feeding configuration of the array according to an embodiment of the present invention.
Figure 2B:
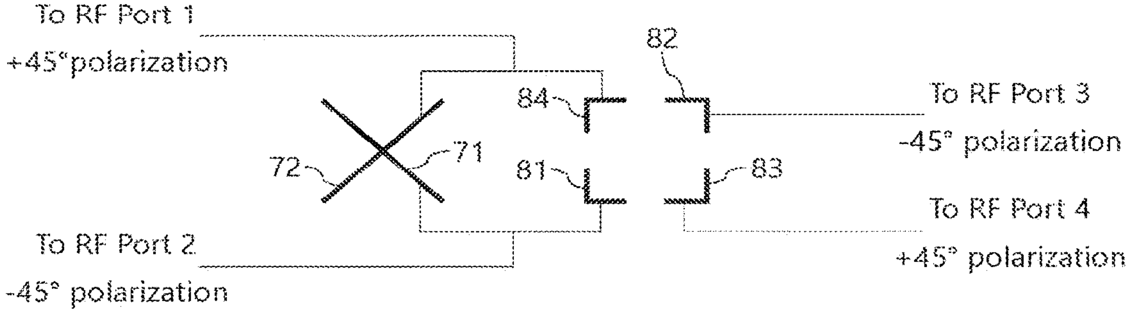
FIG. 2B is a schematic diagram of an array of radiating elements and feeding configuration of the array according to a further embodiment of the present invention.

FIGS. 2A and 2B are schematic diagrams of arrays of radiating elements and feeding configurations of the arrays in a base station antenna according to embodiments of the present invention. The base station antenna includes laterally adjacent first and second arrays, and RF ports 1 through 4. RF ports 1 and 2 respectively provide +45° and −45° polarized RF signals for the first array, and RF ports 4 and 3 respectively provide +45° and −45° polarized RF signals for the second array. The first array includes a DR, and the second array includes a QR. The DR includes a radiator 71 positioned on a −45° slant and a radiator 72 positioned on a +45° slant. The QR includes radiators 81, 82 positioned at two vertices along the +45° direction and radiators 83, 84 positioned at two vertices along the −45° direction.

In the embodiment shown in FIG. 2A, the radiator 72 is coupled to the RF port 1 so as to transmit/receive an RF signal for the first array in the +45° polarization direction, the radiators 71 and 81 are coupled to RF port 2 and fed collectively so as to transmit/receive an RF signal for the first array in the −45° polarization direction, the radiator 82 is coupled to RF port 3 so as to transmit/receive an RF signal for the second array in the −45° polarization direction, and the radiators 83 and 84 are coupled to the RF port 4 and fed collectively so as to transmit/receive an RF signal for the second array in the +45° polarization direction. Each collective feeding may be implemented via a power divider (as described below). A Wilkinson power divider with higher isolation between outputs may be used so as to reduce undesired coupling between radiators that are fed collectively.

In this embodiment, for the second array, there is only one radiator 82 operating in the −45° polarization direction, so the HPBW of the antenna beam generated by the second array in the −45° polarization direction is basically the same as the HPBW of the antenna beam generated by a crossed dipole radiating element with a conventional feeding configuration in the −45° polarization direction. There are two radiators 83 and 84 operating in the +45° polarization direction, and there is a first lateral distance and a first longitudinal distance of about 0.3 to 0.4 times the wavelength between the radiators 83 and 84 (a "distance" between two radiators (or radiating elements) herein refers to the distance between phase centers of electromagnetic radiations emitted by the radiators (or the radiating elements)). Therefore, both in the azimuth plane and the elevation plane, the antenna beam generated by the second array in the +45° polarization direction is slightly narrower than the antenna beam generated by the crossed dipole radiating element with the conventional feeding configuration in the +45° polarization direction. For the first array, there is only one radiator 72 operating in the +45° polarization direction, so the HPBW of the antenna beam generated by the first array in the +45° polarization direction is basically the same as the HPBW of the antenna beam generated by the crossed dipole radiating element with the conventional feeding configuration in the +45° polarization direction. There are two radiators 71 and 81 operating in the −45° polarization direction, and there is a second lateral distance between the radiators 71 and 81 (approximately equal to the lateral distance between the first and second arrays) that is generally greater than the first lateral distance described above. Therefore, in the azimuth plane, the antenna beam generated by the first array in the −45° polarization direction may be narrower than the antenna beam generated by the crossed dipole radiating element in the −45° polarization direction, or be narrower than the antenna beam generated by the second array in the +45° polarization direction.

In the embodiment illustrated in FIG. 2B, the radiators 72 and 84 are coupled to the RF port 1 and fed collectively so as to transmit/receive an RF signal for the first array in a +45° polarization direction, and the radiators 71 and 81 are coupled to the RF port 2 and fed collectively so as to transmit/receive an RF signal for the first array in the −45° polarization direction, the radiator 82 is coupled to the RF port 3 so as to transmit/receive an RF signal for the second array in the −45° polarization direction, and the radiator 83 is coupled to the RF port 4 so as to transmit/receive an RF signal for the second array in the +45° polarization direction.

In this embodiment, for the second array, only one radiator 82 or 83 operates in the polarization direction of −45° or +45°, so the HPBW of the antenna beam generated by the second array in the polarization direction of −45° or +45° is basically the same as the HPBW of the antenna beam generated by the crossed dipole radiating element with the conventional feeding configuration. For the first array, there are two radiators 71 and 81, or radiators 72 and 84 operating in the polarization direction of −45° or +45°, and there is usually a relatively large lateral distance between radiators 71 and 81, or between radiators 72 and 84 (approximately equal to the lateral distance between the first and second arrays), so in the azimuth plane, the antenna beam generated by the first array in the polarization direction of −45° or +45° may be narrower than the antenna beam generated by the crossed dipole radiating element.

In the above embodiment, the radiator (for example, 71) of the DR and the radiator (for example, 81) of the QR that is closer to the DR are fed collectively. It will be appreciated that in other embodiments, the radiator (for example, 71) of the DR may be fed collectively with the radiator (for example, 82) of the QR that is farther away from the DR.

FIGS. 3A through 3D are schematic diagrams of arrays of radiating elements and feeding configurations of the arrays in a base station antenna according to embodiments of the present invention. The base station antenna includes laterally adjacent arrays 320 and 330, phase shifters 351 through 354, and RF ports 311 through 314. RF ports 311 and 313 respectively provide RF signals with −45° polarization and +45° polarization for the array 320, and RF ports 312 and 314 respectively provide RF signals with −45° polarization and +45° polarization for the array 330. The inputs I1 through I4 of the respective phase shifters 351 through 354 are respectively coupled to the RF ports 311 through 314 so as to receive respective RF signals.

Figure 3A:
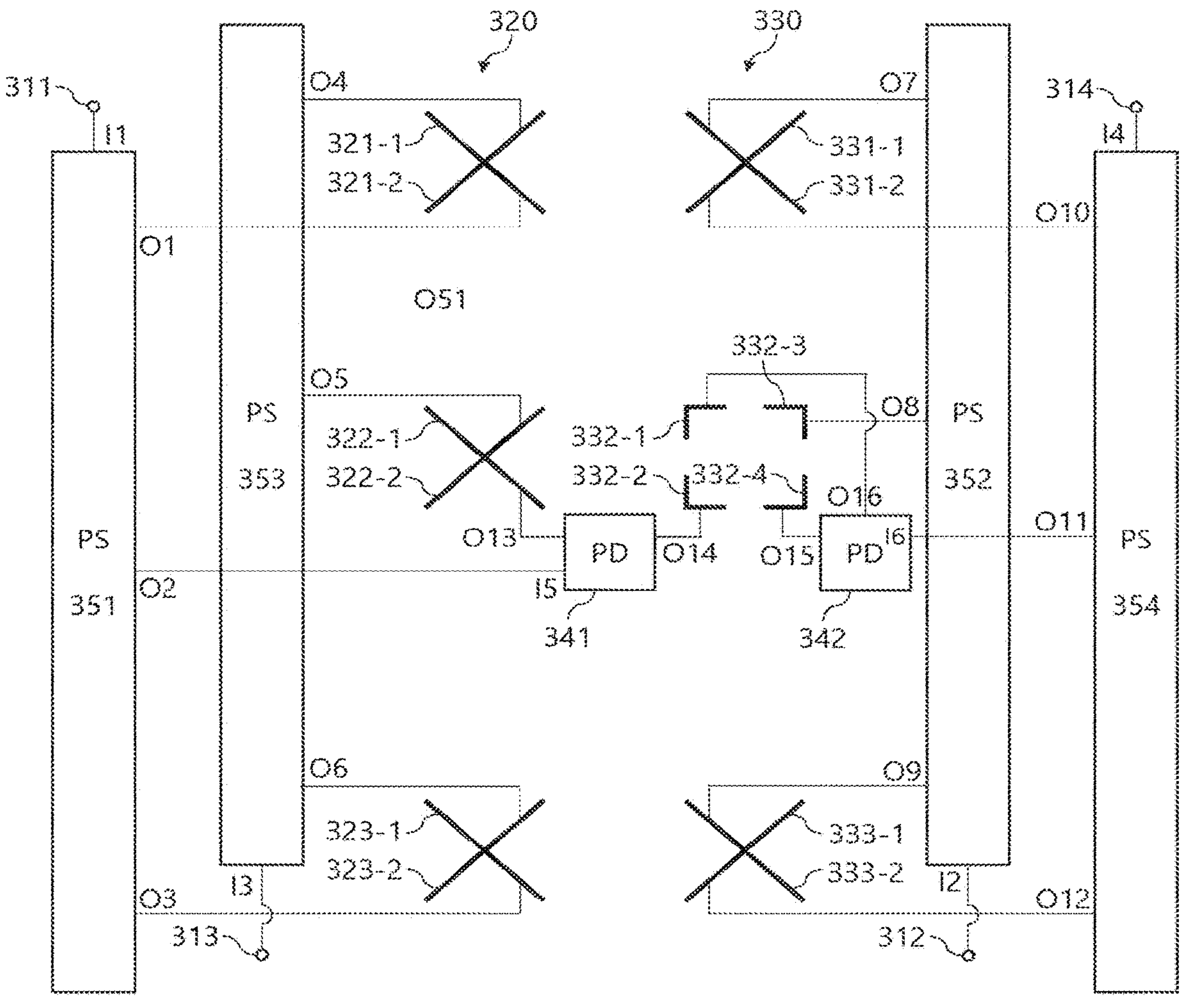
FIG. 3A is a schematic diagram of an array of radiating elements and feeding configuration of the array according to a further embodiment of the present invention.

In the embodiment shown in FIG. 3A, the array 320 includes radiating elements 321 through 323 arranged along the longitudinal central axis of the array 320, and the array 330 includes radiating elements 331 through 333 arranged along the longitudinal central axis of the array 330. The radiating elements 321 through 323, 331 and 333 are DRs, and the radiating element 332 is a box QR. It should be noted that, two-part reference numerals (for example, 321-1) herein may be used to identify the radiators, and the first part of such reference numerals (for example, 321) may be used to refer to radiating element that includes the corresponding radiator.

The antenna further includes power dividers 341 and 342 for feeding the radiators collectively. The input I5 of the power divider 341 is coupled to the output O2 of the phase shifter 351, and the outputs O13 and O14 are coupled to the radiators 322-1 and 332-2, respectively, so that the radiator 322-1 of the radiating element 322 in the array 320 and the radiator 332-2 of the radiating element 332 in the array 330 are fed collectively. The input I6 of the power divider 342 is coupled to the output O11 of the phase shifter 354, and the outputs O15 and O16 are respectively coupled to the radiators 332-4 and 332-1, so that the radiators 332-4 and 332-1 of the radiating elements 332 both in the array 330 are fed collectively.

Furthermore, in the array 320, the radiator 321-1 is coupled to the output O1 of the phase shifter 351, and the radiator 321-2 is coupled to the output O4 of the phase shifter 353. The radiator 322-2 is coupled to the output O5 of the phase shifter 353. The radiator 323-1 is coupled to the output O3 of the phase shifter 351, and the radiator 323-2 is coupled to the output O6 of the phase shifter 353. In the array 330, the radiator 331-1 is coupled to the output O10 of the phase shifter 354, and the radiator 331-2 is coupled to the output O7 of the phase shifter 352. The radiator 332-3 is coupled to the output O8 of the phase shifter 352. The radiator 333-1 is coupled to the output O12 of the phase shifter 354, and the radiator 333-2 is coupled to the output O9 of the phase shifter 352.

In this embodiment, in addition to the radiators 321-1 through 323-1 arranged in a column, radiators operating in the −45° polarization direction for the array 320 further include the radiator 332-2 that is located near the longitudinal central axis of the array 330 and spaced laterally from the radiator 321-2. Accordingly, in the azimuth plane, the antenna beam generated by the array 320 in the −45° polarization direction may be narrower than the antenna beam generated by the array 50-1 or 50-2 with the feeding configuration shown in FIG. 1B or in FIG. 1D. Radiators operating in the +45° polarization direction include the radiators 321-2 through 323-2 arranged in a column, so the HPBW of the antenna beam generated by the array 320 in the +45° polarization direction is basically the same as the HPBW of the antenna beams generated by the array 50-1 or 50-2 with the feeding configuration shown in FIG. 1B.

For the array 330, radiators operating in the −45° polarization direction include the radiators 331-2, 332-3 and 333-2 that are generally arranged in a column (where the radiator 332-3 is slightly offset to the right relative to the longitudinal central axis of the array 330), therefore the HPBW of the antenna beam generated by the array 330 in the −45° polarization direction is basically the same as the HPBW of the antenna beam generated by the array 50-1 or 50-2 with the feeding configuration shown in FIG. 1B. Radiators operating in the +45° polarization direction include radiators 331-1, 332-1 and 332-4, 333-1 that are generally arranged in a column (where radiators 332-1 and 332-4 are respectively slightly offset to the left and right relative to the longitudinal central axis of the array 330), so in the azimuth plane, the antenna beam generated by the array 330 in the +45° polarization direction may be narrower than the antenna beam generated by the array 50-1 or 50-2 with the feeding configuration shown in FIG. 1B. In addition, the HPBW of the antenna beam generated by the array 330 in either the azimuth plane or the elevation plane along the +45° polarization direction is basically the same as or slightly smaller than (since in the array 330, the box QR is closer to the middle of the array) the HPBW of the antenna beam generated by the array 50-1 or 50-2 with the feeding configuration shown in FIG. 1D.

Figure 3B:
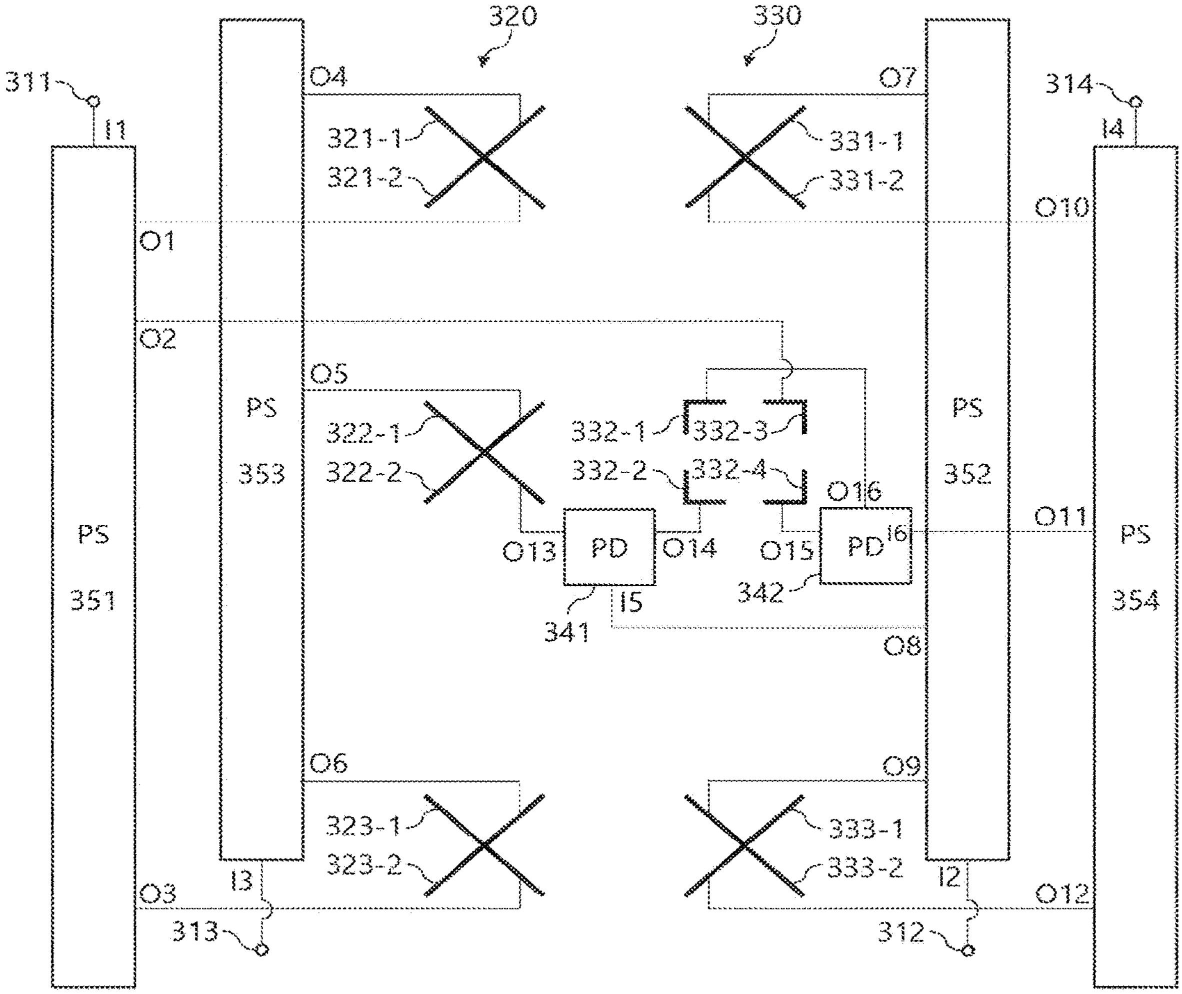
FIG. 3B is a schematic diagram of an array of radiating elements and feeding configuration of the array according to a further embodiment of the present invention.

In the embodiment shown in FIG. 3B, the arrays 320 and 330 include the same radiating elements as those in the embodiment shown in FIG. 3A, but the feeding configuration is different. The input I5 of the power divider 341 is coupled to the output O8 of the phase shifter 352, and the outputs O13 and O14 of the power divider 341 are coupled to the radiators 322-1 and 332-2, respectively, so that the radiator 322-1 of the radiating elements 322 in the array 320 and the radiator 332-2 of the radiating element 332 in the array 330 are fed collectively. The radiator 332-3 of the radiating element 332 is coupled to the output O2 of the phase shifter 351. The feeding configuration for the other radiators is the same as that in the embodiment shown in FIG. 3A.

In this embodiment, for the array 320, radiators operating in the −45° polarization direction includes the radiators 321-1, 332-3, and 323-1, wherein the radiator 332-3 is offset to the right relative to the longitudinal center axis of the array 320 into the vicinity of the longitudinal center axis of the array 330, so that the radiators 321-1, 332-3, and 323-1 are laterally staggered. Therefore, in the azimuth plane, the antenna beam generated by the array 320 in the −45° polarization direction may be narrower than the antenna beam generated by the array 50-1 or 50-2 with the feeding configuration shown in FIG. 1B. The operation of the array 320 in the +45° polarization direction is the same as that in the embodiment shown in FIG. 3A.

For the array 330, in addition to the radiators 331-2, 332-2, and 333-2 that are substantially arranged in a column, radiators operating in the −45° polarization direction further include the radiator 322-1 that is located near the longitudinal center axis of the array 320 and spaced laterally from the radiator 332-2, so in the azimuth plane, the antenna beam generated by the array 330 in the −45° polarization direction may be narrower than the antenna beam generated by the array 50-1 or 50-2 with the feeding configuration shown in FIG. 1B. The operation of the array 330 in the +45° polarization direction is the same as that in the embodiment shown in FIG. 3A.

Figure 3C:
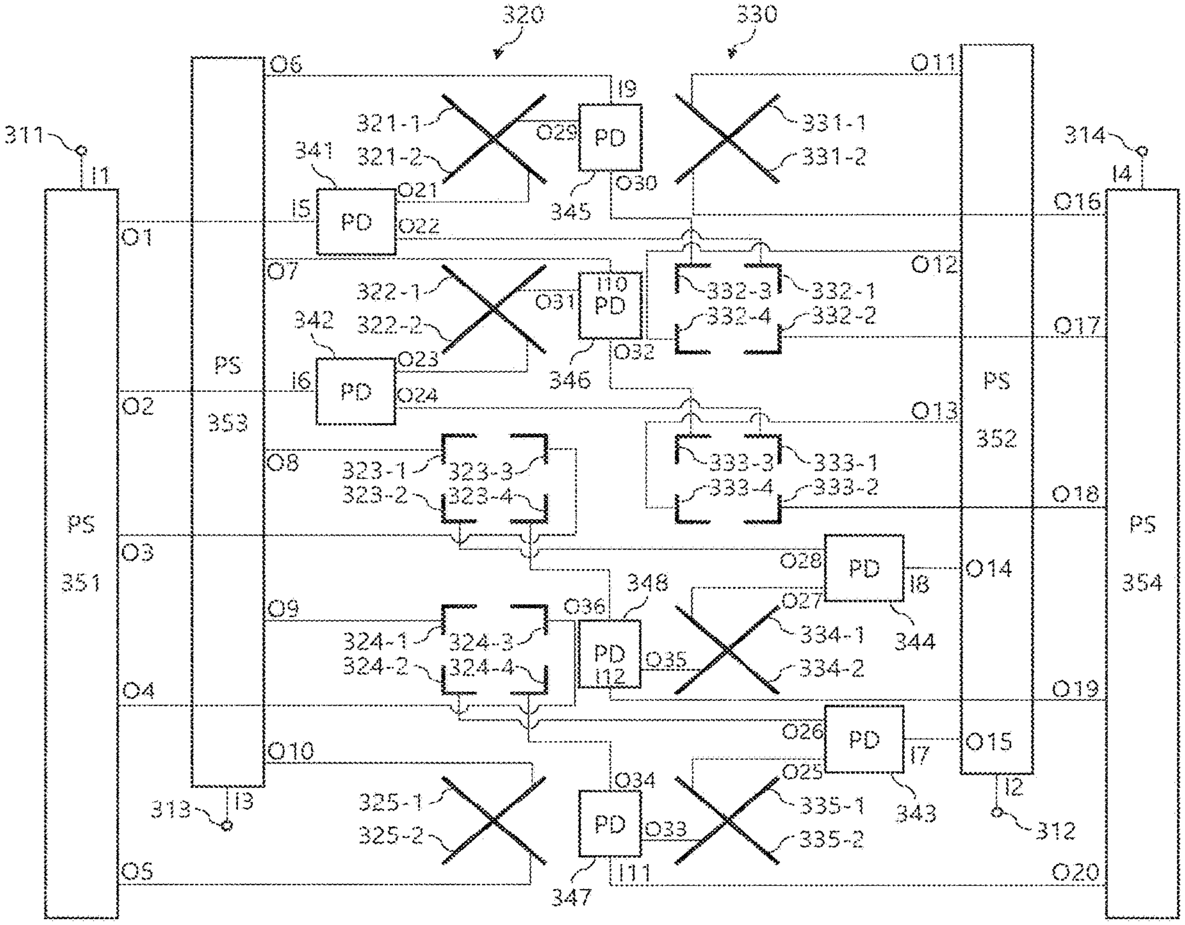
FIG. 3C is a schematic diagram of an array of radiating elements and feeding configuration of the array according to a further embodiment of the present invention.

In the embodiment shown in FIG. 3C, the array 320 includes radiating elements 321 through 325 arranged along the longitudinal center axis of the array 320, and the array 330 includes radiating elements 331 through 335 arranged along the longitudinal center axis of the array 330. The radiating elements 321, 322, 325 and 331, 334, 335 are DRs, and the radiating elements 323, 324, 332, 333 are box QRs. In this embodiment, the positions where the DR/QR in the two adjacent arrays 320 and 330 are arranged are substantially symmetrical about the center of the entire two arrays 320 and 330. In addition, as described below, the feeding configurations of respective radiating elements in the two arrays 320 and 330 are also substantially symmetrical about the center of the entire two arrays 320 and 330. This symmetrical configuration is helpful in reducing the interaction between the two arrays 320 and 330. The antenna further includes power dividers 341 through 348.

The RF signal provided by the output O1 of the phase shifter 351 is fed collectively to the radiators 321-1 and 332-1 via the input I5 and the outputs O21, O22 of the power divider 341. The RF signal provided by the output O2 of the phase shifter 351 is fed collectively to the radiators 322-1 and 333-1 via the input I6 and the outputs O23, O24 of the power divider 342. The RF signals provided by the outputs O3, O4, O5 of the phase shifter 351 are fed to the radiators 323-3, 324-3, 325-1, respectively. The RF signal provided by the output O15 of the phase shifter 352 is fed collectively to the radiators 335-2 and 324-2 via the input I7 and the outputs O25, O26 of the power divider 343. The RF signal provided by the output O14 of the phase shifter 352 is fed collectively to the radiators 334-2 and 323-2 via the input I8 and the outputs O27, O28 of the power divider 344. The RF signals provided by the outputs O13, O12, O11 of the phase shifter 352 are fed to the radiators 333-4, 332-4, 331-2, respectively. The RF signal provided by the output O6 of the phase shifter 353 is fed collectively to the radiators 321-2 and 332-3 via the input I9 and the outputs O29, O30 of the power divider 345. The RF signal provided by the output O7 of the phase shifter 353 is fed collectively to the radiators 322-2 and 333-3 via the input I10 and the outputs O31, O32 of the power divider 346. The RF signals provided by the outputs O8, O9, O10 of the phase shifter 353 are fed to the radiators 323-1, 324-1, 325-2, respectively. The RF signal provided by the output O20 of the phase shifter 354 is fed collectively to the radiators 335-1 and 324-4 via the input I11 and the outputs O33, O34 of the power divider 347. The RF signal provided by the output O19 of the phase shifter 354 is fed collectively to the radiators 334-1 and 323-4 via the input I12 and the outputs O35, O36 of the power divider 348. The RF signals provided by the outputs O18, O17, O16 of the phase shifter 354 are fed to the radiators 333-2, 332-2, 331-1, respectively.

In this embodiment, for the array 320, in addition to the radiators 321-1, 322-1, 323-3, 324-3, and 325-1 that are substantially arranged in a column, radiators operating in a −45° polarization direction further includes radiators 332-1 and 333-1 located near the longitudinal center axis of the array 330, so in the azimuth plane, the antenna beam generated by the array 320 in the −45° polarization direction may be narrower than the antenna beam generated by the array 50-1 or 50-2 with the feeding configuration shown in FIG. 1B or in FIG. 1D. In addition to the radiators 321-2, 322-2, 323-1, 324-1, and 325-2 that are substantially arranged in a column, radiators operating in the +45° polarization direction further include the radiators 332-3 and 333-3 located near the longitudinal central axis of the array 330, so in the azimuth plane, the antenna beam generated by the array 320 in the +45° polarization direction may be narrower than the antenna beam generated by the array 50-1 or 50-2 with the feeding configuration shown in FIG. 1B or in FIG. 1D. The longitudinal distance between the two radiators fed collectively is approximately equal to the longitudinal distance between two adjacent radiating elements in a column, so in the elevation plane, the antenna beam generated by the array 320 in the polarization direction of −45° or +45° may be narrower than the antenna beam generated by the array 50-1 or 50-2 with the feeding configuration shown in FIG. 1B or in FIG. 1D. Due to the centrally symmetrical configuration as described above, the operation of the array 330 in the polarization direction of −45° or +45° is the same as that of the array 320.

Figure 3D:
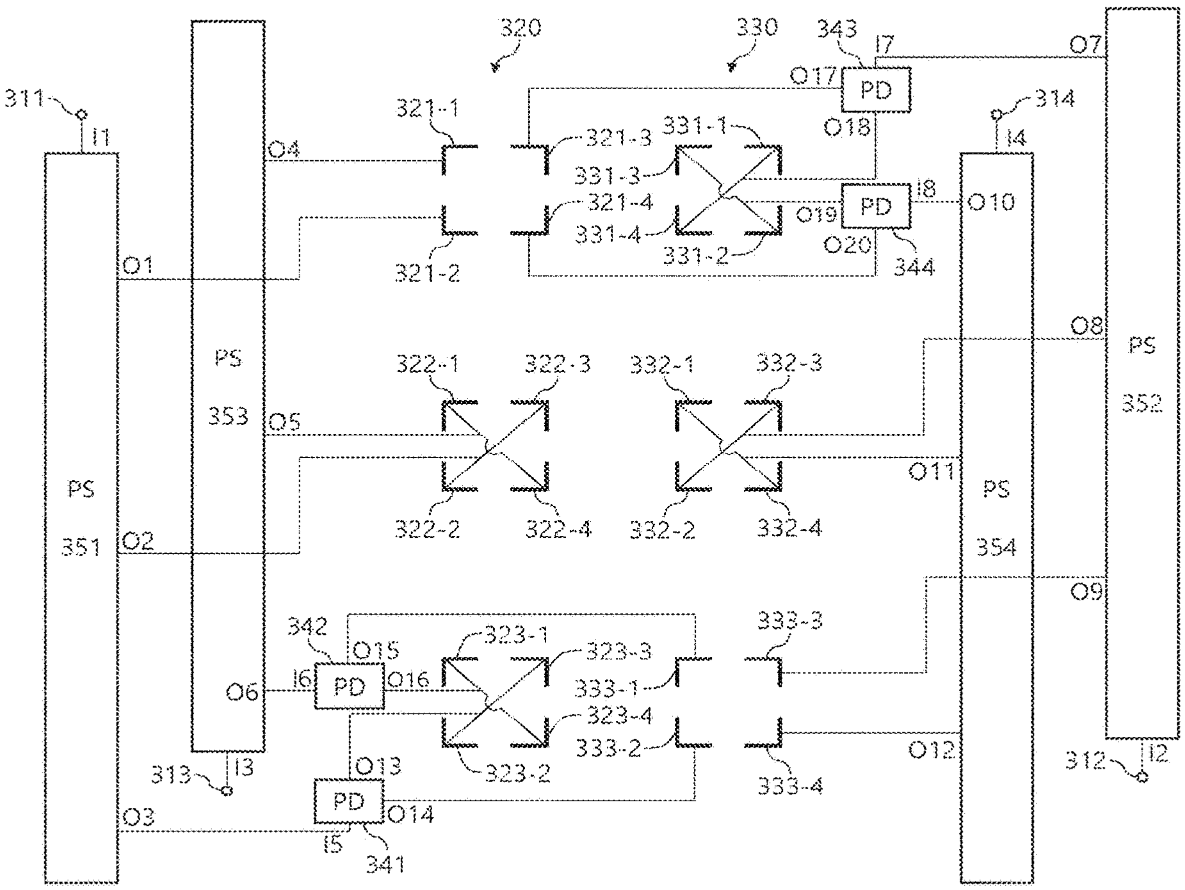
FIG. 3D is a schematic diagram of an array of radiating elements and feeding configuration of the array according to a further embodiment of the present invention.

In the embodiment shown in FIG. 3D, each of the arrays 320 and 330 includes only box QRs and do not include any DRs. This makes the feeding configuration of the array more flexible. A radiator of any QR may be fed collectively with a radiator of a QR in another array so as to obtain a narrower antenna beam and improve beam directivity. One or more QRs may be selected from an array to be such configured. For other QRs not required to be such configured, two radiators in a QR that operate in the same polarization direction may be fed collectively.

The RF signal provided by the output O1 of the phase shifter 351 is fed to the radiator 321-2, the RF signal provided by O2 is fed collectively to the radiators 322-2 and 322-3, and the RF signal provided by O3 is fed collectively to the radiators 323-2, 323-3, and 333-2 via the input I5 and the outputs O13, O14 of the power divider 341. In addition, although the power divider 341 and the lines connecting the radiators 323-2 and 323-3 are shown separately (i.e., two power dividers each having two outputs may be used), it will be appreciated that a single power divider having three outputs may be used to implement collectively feeding to the radiators 323-2, 323-3 and 333-2.

The RF signal provided by the output O7 of the phase shifter 352 is fed collectively to the radiators 321-3, 331-1, and 331-4 via the input I7 and the outputs O17, O18 of the power divider 343, the RF signal provided by the output O8 is fed collectively to the radiators 332-3 and 332-2, and the RF signal provided by the output O9 is fed to the radiator 333-3. The RF signal provided by the output O4 of the phase shifter 353 is fed to the radiator 321-1, the RF signal provided by the output O5 is fed collectively to the radiators 322-1 and 322-4, and the RF signal provided by the output O6 is fed collectively to the radiators 333-1, 323-1, and 323-4 via the input I6 and the outputs O15, O16 of the power divider 341. The RF signal provided by the output O10 of the phase shifter 354 is fed collectively to the radiators 331-3, 331-2, and 321-4 via the input I8 and the outputs O19, O20 of the power divider 344, the RF signal provided by the output O11 is fed collectively to radiators 332-1 and 332-4, and the RF signal provided by the output O12 is fed to the radiator 333-4.

In this embodiment, for the array 320, in addition to radiators 321-2, 322-2, and 322-3, 323-2, and 323-3 that are substantially arranged in a column, radiators operating in the −45° polarization direction further include the radiator 333-2 located near the longitudinal center axis of the array 330, so in the azimuth plane, the antenna beam generated by the array 320 at the −45° polarization direction may be narrower than the antenna beam generated by the array 50-1 or 50-2 with the feeding configuration shown in FIG. 1B or in FIG. 1D. In addition to the radiators 321-1, 322-1 and 322-4, 323-1 and 323-4 that are substantially arranged in a column, radiators operating in the +45° polarization direction further include the radiator 333-1 located near the longitudinal central axis of the array 330, so in the azimuth plane, the antenna beam generated by the array 320 in the +45° polarization direction may be narrower than the antenna beam generated by the array 50-1 or 50-2 with the feeding configuration shown in FIG. 1B or in FIG. 1D. Due to the centrally symmetrical configuration between the two arrays, the operation of the array 330 in the polarization direction of −45° or +45° is the same as that of the array 320.

In the drawings of the present invention, the applications of QR in the base station antennas according to embodiments of the present invention are illustrated with a box QR. It will be appreciated that the QR in the base station antenna according to any embodiment of the present invention is not limited to the box QR.

It will be appreciated that the feeding configuration of the array of radiating elements in the base station antenna according to any embodiment of the present invention may be applied to a multi-band base station antenna. For example, an array of radiating elements operating in another frequency band may be added to the configuration shown in FIGS. 3A to 3D in a manner known in conventional multi-band base station antennas.

It should be noted that in the above description, the port is referred to as "input" or "output" to describe the situation when the base station antenna is transmitting RF signals. It will be appreciated that when the base station antenna receives an RF signal, due to the reversal of the travel direction of the RF signal, the port called "input" herein will operate as "output", while the port called "output" will operate as "input".

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A base station antenna, comprising:

a first radio frequency ("RF") port;

a second RF port;

a third RF port;

a first array of radiating elements that includes a first radiating element, wherein the first radiating element includes first and second radiators each having a first polarization direction, and the first radiator is fed solely by the first RF port;

a second array of radiating elements that includes a second radiating element, wherein the second radiating element includes a third radiator having the first polarization direction so that the second radiator and the third radiator are each fed solely by the second RF port; and a first power divider having a first input that is coupled to the second RF port, and first and second outputs that are respectively coupled to the second and third radiators.

2. The base station antenna of claim 1, further comprising:

a first phase shifter having an input that is coupled to the first RF port, and an output that is coupled to the first radiator; and a second phase shifter having an input that is coupled to the second RF port, and an output that is coupled to the first input.

3. The base station antenna of claim 1, wherein the first array further includes a third radiating element, and the third radiating element includes a fourth radiator having the first polarization direction, wherein the fourth radiator is coupled to the first RF port; and the second array further includes a fourth radiating element, and the fourth radiating element includes a fifth radiator having the first polarization direction, wherein the fifth radiator is coupled to the second RF port.

4. The base station antenna of claim 1, wherein the first array further includes a third radiating element, the third radiating element includes a fourth radiator having the first polarization direction, and the fourth radiator is coupled to the second RF port; and the second array further includes a fourth radiating element, the fourth radiating element includes a fifth radiator having the first polarization direction, and the fifth radiator is coupled to the first RF port.

5. The base station antenna of claim 1, wherein the first and second arrays are both linear arrays extending in a longitudinal direction of the base station antenna.

6. The base station antenna of claim 5, wherein the first and second arrays are adjacent in a lateral direction of the base station antenna.

7. The base station antenna of claim 1, wherein the first power divider is a Wilkinson power divider.

8. The base station antenna of claim 1, wherein each of the first and second radiators includes a dipole radiator having a respective pair of dipole arms that are arranged at a right angle with respect to each other.

9. The base station antenna of claim 1, wherein centers of the first and second radiators are disposed oppositely on both sides of a first straight line that extends along the first polarization direction, and the first straight line substantially passes through a center of the first radiating element.

10. The base station antenna of claim 1, wherein the first radiating element further includes fourth and fifth radiators each having a second polarization direction, and the second radiating element further includes a sixth radiator having the second polarization direction, and the antenna further comprises:

a third RF port;

a fourth RF port, wherein the sixth radiator is coupled to the fourth RF port; and a second power divider having a second input that is coupled to the third RF port, and third and fourth outputs that are respectively coupled to the fourth and fifth radiators.

11. The base station antenna of claim 1, wherein the first radiating element further includes fourth and fifth radiators each having a second polarization direction, and the second radiating element further includes a sixth radiator having the second polarization direction, and the antenna further comprises:

a third RF port that is configured to provide a third RF signal having the second polarization direction, wherein the fourth radiator is coupled to the third RF port;

a fourth RF port that is configured to provide a fourth RF signal having the second polarization direction; and a second power divider having a second input that is coupled to the fourth RF port, and third and fourth outputs that are respectively coupled to the fifth and sixth radiators.

12. The base station antenna of claim 1, wherein the first radiating element further includes fourth and fifth radiators each having a second polarization direction, the second array further includes a third radiating element, and the third radiating element includes a sixth radiator having the second polarization direction, and the antenna further includes:

a third RF port that is configured to provide a third RF signal having the second polarization direction, wherein the fourth radiator is coupled to the third RF port;

a fourth RF port that is configured to provide a fourth RF signal having the second polarization direction; and a second power divider having a second input that is coupled to the fourth RF port, and third and fourth outputs that are respectively coupled to the fifth and sixth radiators.

13. The base station antenna of claim 1, wherein the second radiating element further includes a fourth radiator having the first polarization direction; and the first power divider further has a third output that is coupled to the fourth radiator.

14. The base station antenna of claim 1, wherein the second radiating element further includes a fourth radiator having the first polarization direction, and the antenna further comprises:

a second power divider having a second input that is coupled to the first RF port, and third and fourth outputs that are respectively coupled to the first and fourth radiators.

15. A base station antenna, comprising:

a first radio frequency ("RF") port;

a second RF port;

a first array of radiating elements that includes a first radiating element having first and second radiators that each have a first polarization direction and third and fourth radiators that each have a second polarization direction; and a second array of radiating elements that includes a second radiating element, the second radiating element comprising a cross-dipole radiating element having a fifth radiator having the first polarization direction and a sixth radiator having the second polarization direction, wherein the first and second radiators are coupled to the first RF port and not to the second RF port the third radiator and the sixth radiator are coupled to the second RF port and not to the first RF port.

16. The base station antenna of claim 15, further comprising a first power divider having a first input that is coupled to the second RF port, and first and second outputs that are respectively coupled to the third and sixth radiators.

17. A base station antenna, comprising:

a first radio frequency ("RF") port;

a second RF port;

a first array of radiating elements that includes a first radiating element having first and second radiators that each have a first polarization direction and third and fourth radiators that each have a second polarization direction;

a second array of radiating elements that includes a second radiating element, the second radiating element comprising a cross-dipole radiating element having a fifth radiator having the first polarization direction and a sixth radiator having the second polarization direction;

a first power divider having a first input that is coupled to the second RF port, and first and second outputs that are respectively coupled to the third and sixth radiators; and a second power divider having a first input that is coupled to the first RF port, and first and second outputs that are respectively coupled to the first and second radiators, wherein the first and second radiators are coupled to the first RF port and the third radiator and the sixth radiator are coupled to the second RF port.

18. The base station antenna of claim 15, wherein the first array further includes a third radiating element, the third radiating element comprising a cross-dipole radiating element having a seventh radiator having the first polarization direction and an eighth radiator having the second polarization direction, the seventh radiator coupled to the first RF port.

19. A base station antenna, comprising:

a first radio frequency ("RF") port;

a second RF port;

a third RF port;

a first column of radiating elements that includes a first radiating element having first through fourth radiators and a third radiating element that is coupled to the second RF port;

a second column of radiating elements that includes a second radiating element, the second radiating element comprising a cross-dipole radiating element having a first dipole radiator and a second dipole radiator that is coupled to the third RF port; and a three port power divider having an input coupled to the first RF port, a first output that is coupled to the first radiator of the first radiating element and a second output that is coupled to the first dipole radiator of the second radiating element.

20. The base station antenna of claim 19, wherein the first array is a first linear array of radiating elements and the second array is a second linear array of radiating elements that is laterally spaced apart from the first linear array.

21. The base station antenna of claim 1, wherein the first power divider is a three port power divider.

22. The base station antenna of claim 1, wherein the first radiating element is a dual-polarized radiating element and the second radiating element is a quad-polarized radiating element.

23. The base station antenna of claim 19, further comprising a fourth RF port, wherein the second radiator of the first radiating element is coupled to the fourth RF port.

* * * * *